United States Patent [19]

Garrison

[11] 4,174,314

[45] Nov. 13, 1979

[54] DENSITY FRACTIONATION PROCESS TO RECOVER VEGETABLE SEED PROTEINS

[75] Inventor: Charles M. Garrison, Fairfield, Ohio

[73] Assignee: The Procter & Gamble Company, Cincinnati, Ohio

[21] Appl. No.: 922,922

[22] Filed: Jul. 7, 1978

[51] Int. Cl.$^2$ ............................................... A23J 1/14
[52] U.S. Cl. ................................... 260/123.5; 426/656
[58] Field of Search .......................... 260/123.5, 112 R

[56] References Cited

U.S. PATENT DOCUMENTS

| | | | |
|---|---|---|---|
| 2,495,706 | 1/1950 | DeVoss et al. | 260/123.5 X |
| 2,500,453 | 3/1950 | Denehy | 260/123.5 X |
| 2,635,094 | 4/1953 | Belter et al. | 260/123.5 |
| 3,268,503 | 8/1966 | Mustakas et al. | 260/123.5 |
| 3,365,440 | 1/1968 | Circle et al. | 260/123.5 |
| 3,630,753 | 12/1971 | Melnychyn et al. | 260/123.5 X |
| 3,734,901 | 5/1973 | Hayes et al. | 260/123.5 |
| 3,762,929 | 10/1973 | DeLapp | 260/123.5 X |

OTHER PUBLICATIONS

Arch. of Biochem. and Biophys. 124, 466–471 (1968), Yatsu et al.
Plant Physiol. 58, 703–709 (1976), Youle et al.
Plant Physiol. 58, 710–716 (1976), Tully et al.
Plant and Cell. Physiol. 16, 933–937 (1975), Mikola et al.
Arch. of Biochem. and Biophys. 95, 402–404 (1961), Altschul et al.
Plant Physiology, vol. 42, 1967, Tombs, pp. 797–813.

*Primary Examiner*—Howard E. Schain
*Attorney, Agent, or Firm*—Walter L. Stumpf; Jerry J. Yetter; Richard C. Witte

[57] ABSTRACT

A density fractionation process for recovering vegetable seed protein granules from the remaining portion of the vegetable seeds, using a polyol or mixture of polyols having a density of from about 1.0 to about 1.4, or, a ternary, single-phase solution of a polyol, water, and a carbohydrate, said ternary solution having a density of from about 1.0 to about 1.4 g/ml and a water activity of less than about 0.90.

13 Claims, No Drawings

DENSITY FRACTIONATION PROCESS TO RECOVER VEGETABLE SEED PROTEINS

TECHNICAL FIELD

Many types of vegetable seeds contain protein of sufficient quality and concentration to be nutritionally useful for humans. Unfortunately, because the vegetable seeds are often in a form unacceptable to human tastes, their valuable protein material is not conveniently used. Soybean seeds, for example, not only have high concentrations of protein and a high protein efficiency ratio, they also have seed flavor notes which are unacceptable to many humans as well as other seed materials which tend to induce flatulence. It can be appreciated that there is a continuing need for commercially feasible processes to separate the edible protein present in vegetable seeds from the undesirable and inedible materials. Successful protein separation techniques allow direct human consumption of vegetable protein found in previously unpalatable sources, for example, the protein-rich residues which are left after the oil is extracted from oleaginous seeds such as soybeans.

The walls and cells of desirable seed sources of vegetable protein consist primarily of lipid, insoluble cellulosic materials, soluble carbohydrates, etc. In such vegetable seed protein sources, the majority of the protein is present in the form of discrete granules. Accordingly, the protein granules need to be released from the balance of the seed structure to be used, for example, in the manufacture of vegetable-based meat analog products, and the like.

The protein of vegetable seeds, especially oleaginous seeds such as soybeans, peanuts, sunflower seeds, and cottonseeds, is usually obtained in the form of an isolate or concentrate. The vegetable seeds are first comminuted or ground to form flakes, meals, or flours, which are either extracted with a solvent, e.g., hexane, or pressed to remove the oil and lipid materials. In past practice this defatted mass is then extracted to solubilize the protein, and remove it from the residual cellular components, thus yielding an isolate. This defatted mass can be washed with an alcohol/water solution to dissolve and remove more residual nonproteinaceous material and yield a concentrate. Concentrates, however, generally have low protein contents.

Traditional protein extraction processes for producing isolates from the defatted mass use aqueous alkaline solutions or water to solubilize the protein. The solubilized protein can then be removed from the insoluble seed materials and precipitated and recovered by various means; isoelectric precipitation, for example.

There are many inherent disadvantages in the art-disclosed protein extraction procedures. The tendency to denature the protein by excessive heat or harsh pH's detrimentally affects the physical and chemical characteristics of the protein. Denatured proteins are difficult to use in certain commercial applications. Some separation methods use flammable solvent systems. Still other methods use halogenated organic solvents, which may be undesirable where the ultimate product is to be consumed by humans.

As noted, many types of vegetable seeds, especially oleaginous seeds such as soybeans and cottonseeds, contain their protein in the form of discrete particles. The present invention provides a means for conveniently separating such protein particles from vegetable seeds by means of a density fractionation process. In this process, a toxicologically-acceptable polyol or a ternary solvent system comprising a polyol, water, and a carbohydrate (e.g. sucrose) is used to separate the protein particles from the other cellular components.

BACKGROUND ART

U.S. Pat. No. 3,794,735, Newsom, et al., Feb. 26, 1974 discloses a method for isolating protein from protein bearing seeds without removing the lipid (defatting). An aqueous emulsion of protein and water is formed and centrifuged to remove cellulosic materials. The protein is recovered by isoelectric precipitation.

M. P. Tombs, *Plant Physiology*, 42, 797 (1967) describes a method of isolating protein bodies from soy meal by density gradient centrifugation using a 70% to 90% (wt/vol) aqueous sucrose solution having a density from 1.25 to about 1.34. The reference also describes the swelling and bursting of protein bodies when the meal is placed in contact with water, a problem which is said to be solved by buffering at pH 5.

Certain other density fractionation-type processes for separating protein from other cellular materials are known. U.S. Pat. No. 3,828,017, Finley, et al. (1974) discloses the centrifugation of a slurry of pulverized soy material and liquid fluorocarbon having a density of 1.35 to 1.45.

Other methods for isolating protein have involved extraction with mixtures of polar and nonpolar solvents and dissolution with reprecipitation of protein. U.S. Pat. No. 2,278,670, Rauer, Apr. 7, 1942, discloses a two-step process for recovering protein using organic solvents and alkali.

U.S. Pat. No. 3,043,826, Beaber, et al., July 10, 1962 discloses the extraction of protein from alcohol-treated soybean material by contact with water at alkaline or acidic pH's and with subsequent recovery by precipitation.

Japanese Pat. No. 2,130,942, Ajinomoto, Apr. 22, 1976 (abstract) discloses the separation of protein material by isoelectric precipitation.

Other separation procedures are also known. U.S. Pat. No. 3,734,901, Hayes, et al., May 22, 1973 discloses a protein concentration step in which nonproteinaceous materials are separated from vegetable seed material using a monohydric alcohol/water extraction medium. U.S. Pat. No. 3,649,293, Hoer, et al., Mar. 14, 1972 teaches the separation of protein by solubilizing the protein, and depositing the protein on solid cellular material, separating the protein-carrying solids, which are processed further.

DISCLOSURE OF THE INVENTION

The present invention encompasses a process for recovering vegetable seed protein granules from vegetable seed material, comprising suspending comminuted vegetable seed material in an aliphatic polyol or mixture of aliphatic polyols having a density of from about 1.0 to about 1.4 and isolating the vegetable seed protein granules from the balance of the vegetable seed material.

The present application also encompasses a process for recovering vegetable seed protein granules from comminuted vegetable seed material, comprising:

(1) suspending said comminuted vegetable seed material in a solution comprising an aliphatic polyol, a carbohydrate, and water, said solution having a density of from about 1.0 to about 1.4, and a water activity of less than about 0.90; and (2) isolating the vegetable seed protein granules from the balance of the seed materials.

The present invention takes advantage of the fact that the difference in density between the protein granules and the residual cellular material of ground vegetable seed material can be used as a basis for a density fractionation process. Through the careful control of the density and the viscosity of the polyol separation solvent and the density, water activity and viscosity of the ternary water/carbohydrate/polyol separation solution, separations can be made with ease and without hydrating and adversely denaturing the protein granules or proteins contained therein. The result is a vegetable protein having superior physical characteristics for commercial formulation as well as superior protein quality.

By "vegetable seed protein granules" and "protein granules" as used herein is meant aleurone grains or protein bodies. Aleurone grains and protein bodies are granules of reserve or storage protein and are typically found in the seeds of many species of plants. Such reserve or storage proteins differ in their physical and chemical properties from proteins typically found in generalized cell protoplasm. Such subcellar granules or organelles contain most of the protein material, for example, in soybeans. Protein bodies and aleurone granules range in diameter from the $0.1\mu$ in the high lysine corn mutant "opaque-2," to about $20\mu$ in soybeans; a typical size range is from 2 to $8\mu$.

By "vegetable seed material" as used herein is meant plant seeds which contain protein granules. Among the vegetable seed materials known to contain protein granules are cereal grains including rice, oats, barley, millet, corn, grain sorghum, and immature wheat (in mature wheat the granules fuse together). Other vegetable seed materials which can be used herein include various non-oleaginous legumes such as peas, broad beans, jack beans, lima beans, mung beans, and lentils, all of which are reported as having protein granules.

The preferred class of vegetable seed materials used herein encompasses the "oleaginous seeds." By "oleaginous seeds" is meant such oil- and protein granule-containing seeds as cottonseeds, soybeans, peanuts, rapeseed, copra, sunflower seeds, and the like. The most preferred vegetable seed material is the seed of the soybean. The oleaginous seeds may contain their natural amount of lipid, lipid can be added up to about 70%, or, preferably, they have been defatted—most of the lipid has been removed so the lipid content is in the range of 0% to 5%. Additionally, lipid can be added to defatted seed materials or to materials which do not naturally contain lipid.

By "aliphatic polyol" as used herein is meant an aliphatic hydrocarbon having two or more hydroxy substituents. Polyols useful herein are liquid at temperatures from 20° C. to about 70° C. and have densities of from about 1.0 to about 1.4 grams/ml; mixtures of polyols can also be used. Food grade or feed-approved aliphatic polyols are preferred. Lower aliphatic polyols having from $C_2$ to $C_4$ are preferred, for example, lower aliphatic diols such as 1,2-propylene glycol, and 1,3-propylene glycol. Lower aliphatic triols are especially preferred for use herein, especially glycerin.

Commercial or solvent grade polyols can be used herein and are especially suited for use in polyol/water/carbohydrate separation solutions since commercial or solvent grade polyols generally contain from about 1% to about 10% water. While water tends to lower the density of the polyol, within the specified water activity limits it does not interfere with the density fractionation process; up to about 45 parts per water can be present in the polyol without interfering with the instant process. In addition, different polyols can be mixed to achieve a desired density, and other compounds, such as ethanol, can be added to affect the density and wetting characteristics of the polyol.

The term "carbohydrate" is used herein in its usual context to mean a water-soluble saccharidic compound of carbon, hydrogen, and oxygen that contains the saccharose grouping. Soluble monosaccharides, disaccharides, and low molecular weight polysaccharides are preferred types of carbohydrates suitable for use herein.

Monosaccharides useful herein include simple sugars such as fructose and glucose. Disaccharides include such compounds as sucrose, maltose, and lactose.

The carbohydrates used herein may be either purified or unrefined. For example, corn syrup, a mixture of glucose, maltose, and maltodextrins, can be used as the carbohydrate component. Highly preferred carbohydrates are the non-reducing disaccharides, in particular, sucrose. Other carbohydrates which can be used herein include fructose, glucose, raffinose, stachyose, corn syrup, low molecular weight dextrans, and soluble plant sugars.

The term "water activity" ($a_w$) is used herein in its usual context to mean the ratio of the fugacity of water in a solution (f) to that of pure water ($f_o$) at the same temperature. The water activity of a solution can be conveniently measured on a Sina Hygrometer, Type SMT-B, which provides a direct determination of $a_w$. The water activity of an ideal aqueous solution is 0.9823 for a 1 molal solution. However, as the concentration of polyols and electrolytes increase, their solutions depart significantly from ideal behavior.

By "isolating" as used herein is meant a separation procedure by which the protein granules can be separated from the residual vegetable seed material. This separation is usually accomplished by using centrifugation to perform a density fractionation followed by a physical separation and removal of the protein granule layer from the remainder of the density fractionated mixture. The isolation step can be performed using high or low centrifuge velocities and can even be accomplished by letting the suspension of comminuted seed material fractionate by the force of gravity. Centrifugation is the preferred mode for density fractionation and useful centrifuge forces for this purpose are typically in the range of 1,700 g to 17,000 g.

By "comprising" is meant that other materials may be present in the separation solutions and other processing steps can take place so long as they do not adversely affect either the vegetable material or the required physical chemical characteristics of the solutions used for the density fractionation. Thus, the term comprising encompasses the more restrictive terms "consisting essentially of" and "consisting of."

Composition percentages used herein are weight/weight.

To achieve an efficient separation of the protein granules from the other components of the vegetable seed material during the density fractionation process, the vegetable seed material must be finely ground or comminuted. The grinding or comminution frees as many of the protein granules as possible from the cellular structure of the seeds. Especially where oleaginous seeds are used, this grinding is more easily accomplished if the seed material is defatted to a lipid concentration of less than about 5% before grinding. However, oleaginous seeds can first be flaked or ground and then defatted for use in the present process, or, they need not be defatted at all.

Any conventional method of defatting oleaginous seeds can be used. In most conventional defatting processes, the oleaginous seed is first roll milled or comminuted to form thin flakes or meal. This exposes a greater surface area and accelerates the defatting process. The flakes or meal are then either pressed to remove the oil and lipid materials, or extracted with a solvent such as hexane. The solvent is then removed by methods such as air drying to produce low lipid content oleaginous seed flakes, meal, or flour.

Any conventional mode of grinding can be used to reduce the particle size of the low lipid content vegetable material. The following methods are examples of acceptable grinding methods, jet milling, pin milling, hammer milling, ball milling, or vibrational energy milling. Jet milling is especially efficient in reducing the particle size of the seed material. Where lipid-containing seed materials are used, undefatted soybeans for example, the preferred modes of grinding are hammer milling after freezing the seeds or milling with a colloid mill after adding excess lipid, up to about 70% total lipid, to the seeds.

The particle size of the ground seed material should be in the range of about 20 to about 150 microns. The particle size can be less than about 20 microns. However, as the particle size is reduced, the protein granules also become comminuted with a resulting increase in protein loss from solubilization. Preferably, at least 90% (by weight) will be less than 80 microns to promote an efficient separation and release of the protein granules from other cellular material by the present process.

In the preferred method of this invention, defatted soybean flakes, meal or concentrate with a lipid content of 0% to about 5% are milled to a particle size of about 30 to about 80 microns.

When the comminuted seed material is added to the ternary separation solution comprising water/carbohydrate/polyol of specified density and water activity, the carbohydrate is the major element in controlling the density of the separation solution. The density range, given in gram/ml, for the ternary fractionation solutions as well as for the polyol solvent, of the present invention is from about 1.0 to 1.4, with a preferred range of about 1.2 to about 1.40. When operating in this range, the protein granules are easily separated from both the ternary solution and the more dense, insoluble residual vegetable seed materials, such as cellulose and other insoluble carbohydrate materials, present in the starting vegetable material.

In the ternary fractionation solution, the polyol performs the important function of reducing the water activity of the solution, thereby greatly facilitating the separation. Applicant has discovered that the detrimental effect that high water activity has on protein separations involving vegetable seed material can be greatly reduced either by using a polyol separation solvent or a ternary solution with a polyol component. Unless the water activity of the ternary solution is kept lower than about 0.9, preferably below about 0.85, and most preferably below about 0.80, both the protein granules and the seed residues hydrate and swell, and, as a result, the densities of the protein granules and the seed residues approach one another. If hydration is allowed to occur and the densities of all materials in the separation solution become too close, a separation based on density will be difficult to achieve. By maintaining the water activity below the specified limits, hydration is reduced, the density difference between the protein granules and the seed residue is maintained, and separation can be achieved to yield high quality protein.

Still another benefit of the low water activity required for the separation is the inhibition of bacterial growth; something of an antimicrobial effect is achieved.

Food or feed-approved antibacterial, anti-fungal, and antioxidant agents can be added to the polyol and ternary aqueous solutions of polyol and carbohydrate without deleterious effect. Such additives are preferred when the density fractionation process is operated at or above room temperature for several hours.

At certain concentrations of electrolyte and carbohydrate, the solution may become inconveniently viscous, either from the suspended comminuted vegetable seed material or from dissolution of the sugars naturally present in the vegetable seed material. For ease in handling the solution, it is preferred to maintain a viscosity of from about 1 centipoise to about 300 centipoise; a viscosity of from about 1 centipoise to about 100 centipoise is most preferred.

In a typical procedure the comminuted seed matter is suspended through intimate mixing with the polyol or with the ternary aqueous polyol/carbohydrate solution. Any conventional mode of mixing can be used. High shear mixing is preferred, but simple stirring is also an acceptable mode.

A vegetable seed material to solution ratio of about 1:4 to about 1:100 (parts by weight) is acceptable for use in this process. Preferred for use herein is a defatted, comminuted oleaginous seed: solution ratio of about 1:5 to about 1:20 (parts by weight).

The contact time between the polyol or ternary carbohydrate/polyol/water separation solution and the protein granules, as well as the temperature, affects the yield and the amount of protein recovered.

Generally, from about 5 minutes to 15 hours of mixing time is sufficient. The time of mixing is dependent both upon the temperature of the solution and the type of mixing used. About 1-2 hours of mixing using simple magnetic stirring at 25° C. is adequate. High shear mixing using a higher temperature, 50° C. for example, requires less time.

The temperature at which the mixing occurs and at which the density fractionation is accomplished can be as low as about 0° C., so long as the solution is liquid, to about 70° C., preferably from about 15° C. to about 50° C. The higher the temperature, the less viscous the solution and thus the easier to handle. However, as the temperature is increased, the rate of denaturation of the protein increases.

After mixing, the vegetable seed material/water/polyol/carbohydrate mixture or vegetable seed material/polyol mixture is density fractionated. If an oil-containing seed material is used, a top layer comprising lipid is formed. The remaining layers are the same whether lipid containing or defatted vegetable seed materials are used. The next layer contains 60% to 90% of the protein (as granules) present in the starting vegetable material. The middle layer consists of water/polyol/carbohydrate solution, or polyol solvent, which also contains water-soluble salts and sugars present in the vegetable seed material and a minor amount of protein. The bottom layer is primarily composed of the insoluble cellulosic and insoluble carbohydrate materials that make up the seed walls and other portions of the seed; however, a minor amount of protein may also be present.

The protein granule containing layer is separated from the remaining layers by conventional methods such as decantation, filtration, etc. The protein recovery is typically 60–80% of the protein present in the original vegetable seed material. The remaining protein is found either in the middle solvent layer or is still associated with the insoluble carbohydrates. The fractionation solution can be recycled.

In a preferred mode, the present invention also encompasses a process which comprises suspending comminuted, defatted oleaginous seed material with the polyol or the three-component aqueous solution as described; isolating the protein granules from the vegetable seed residue as described; defatting the protein granules, where the starting material contains more than about 5% lipid; and as a final, optional step, a concentration/extraction treatment which selectively extracts non-proteinaceous components from the protein granules and concentrates the protein.

For example, an extraction of the protein granules isolated by centrifugation and separation with one of the following water-alcohol systems can provide an oleaginous seed protein concentrate. This solvent extraction further concentrates the separated protein by dissolving and carrying away any residual non-proteinaceous components, principally additional extraneous vegetable carbohydrates.

The alcohols suitable for practicing the optional extraction/concentration step include the lower low molecular weight alcohols, such as methanol, ethanol, 1-propanol, 2-propanol, and the butanols. The most preferred alcohol is ethanol, for both organoleptic and safety reasons.

The preferred water-ethanol extraction solvent comprises from about 50 parts by weight to about 90 parts by weight alcohol, the balance being water. The most preferred water-alcohol system is from about 50 parts to about 70 parts ethanol and from about 30 to about 50 parts water (by weight).

The optional concentration/extraction step can be conducted in a temperature range from about 20° C. to about 60° C.; about 20° C. to about 30° C. is preferred.

Whether or not the optional concentration/extraction step is performed, final desolventizing of the oleaginous protein material is not critical and can be achieved by conventional means such as free draining or centrifugation followed by forced air drying, filtration followed by drying, etc. The preferred methods are forced air drying of drained flakes at a temperature of from about 40° C. to about 90° C. and steam desolventizing.

BEST MODE OF CARRYING OUT THE INVENTION

Soy flour (100 g) containing about 20% lipid and having a particle size between 20 and 100 microns, is mixed with glycerine (density = 1.26, 1000 g) for 3 hours at room temperature. The mixture is centrifuged at 1700 g to produce a solid upper layer containing about 75% protein (on a dry, lipid-free basis); a center layer of glycerine containing some of the soluble carbohydrate material and some of the lipid material present in the soy flour; and a solid lower layer which contains the insoluble cellulosic material. The bottom layer has about a 49% protein on a dry, lipid free basis. The upper layer contains about 86% of the protein originally present in the soy flour.

The upper layer is separated, defatted using a hexane solvent extraction, and washed with a solution of 60 parts ethanol and 40 parts water to form a protein concentrate.

When the soy flour in Example I is replaced by soybean meal having a 70% and a 10% lipid content, or by cottonseed meal having a lipid content of about 60%, and comminuted to the specified particle size, similar results are obtained.

When the density separated soy protein is supplemented with a nutritionally-supplemental amount of N-acetyl-L-methionine or its derivatives, in the manner disclosed in U.S. Pat. Nos. 3,878,305 and 3,952,115, incorporated herein by reference, a product having a protein efficiency ratio (PER) similar to ground beef (3.0) results. Commercial isolates supplemented with equivalent amounts of N-acetyl-L-methionine have a lower PER (about 2.5).

INDUSTRIAL APPLICABILITY

EXAMPLE I

Soy protein concentrate homogenized with soybean oil so that it contains about 70% lipid is milled to obtain a particle size of between 10 and 80 microns. This material is mixed with 1,2-propylene glycol (density equals 1.04) at a ratio of concentrate to glycol of 1:15. The mixture is stirred at room temperature for twenty minutes and then centrifuged to produce a solid upper layer containing about 61% of the protein originally present in the soybean concentrate, a center layer of 1,2-propylene glycol containing some of the soluble carbohydrate material and some of the lipid material present in the soy concentrate; and a solid lower layer which contains about 39% of the protein originally present in the soy concentrate.

The lower protein containing layer is separated and washed with ethanol to remove any residual propylene glycol.

When the soy concentrate in Example II is replaced by defatted soybean flour to which lipid has been added to a level of 50%, similar results are obtained.

EXAMPLE II

Soybean concentrate having about 50% lipid and an average particle size of about 40 microns (100 g) is mixed with a glycerine/water solution which contains 90 parts glycerine to 10 parts water (1,000 g; density is 1.224). The mixture is stirred for half an hour and then centrifuged using an imperforate basket centrifuge to produce a solid protein rich upper layer which contains about 65% of the protein originally present in the soybean concentrate. This protein rich layer is separated and washed with 50% aqueous ethanol to remove any residual glycerine material and soluble carbohydrate.

When the glycerine/water mixture of Example I is replaced by a mixture containing 60% glycerine and 40% water, similar results are obtained.

When the soybean concentrate is replaced by an equivalent amount of soybean meal containing about 50% lipid or soybean isolate containing about 50% lipid, similar results are obtained.

EXAMPLE III

| Ingredients | Parts by Weight |
|---|---|
| Glycerine | 10 |
| Sucrose | 60 |
| Water | 30 |

Defatted soybean meal (50 g) which has an average particle size of about 50 microns is mixed with 250 g of the ternary mixture at 23° C. The density of the solution is about 1.33 g/ml. The mixture is centrifuged using an imperforate basket centrifuge to produce a solid protein rich upper layer which contains after desugaring about 80% protein by nitrogen analysis. This upper fraction represents about 70% of the protein present in the soybean meal originally.

When the sucrose of Example II is replaced by an equivalent amount of glucose and/or corn syrup solids, similar results are obtained.

When the soybean meal is replaced by an equivalent amount of defatted cottonseed meal, peanut meal, or sunflower meal, similar results are obtained.

Protein products prepared in the manner of Examples I, II and III can be used as food supplements for humans or lower animals. The protein products can also be texturized by various well-known means to provide meat analogs in the form of "vegetable-based" ground beef analogs, vegetable-based ground beef patties, vegetable-based sausage, vegetable-based meat or cheese-type spreads, and the like.

What is claimed is:

1. A process for recovering vegetable seed protein granules from comminuted vegetable seed material containing protein granules, comprising:
    (1) suspending said comminuted vegetable seed material in a solution comprising an aliphatic polyol, a carbohydrate, and water, said solution having a density of from about 1.0 to about 1.4 g/ml and a water activity of less than about 0.90; and
    (2) isolating the vegetable seed protein granules from the balance of the seed materials.

2. A process according to claim 1 wherein said vegetable seed materials are oleaginous seeds selected from the group consisting of soybeans, cottonseed, sunflower seeds, peanuts, copra, and rapeseed.

3. A process according to claim 2 wherein said oleaginous seeds have a lipid content of from about 0% to about 5%.

4. A process according to claim 3 wherein said oleaginous seeds are selected from the group consisting of soybean meal, soybean flour, and soybean concentrate.

5. A process according to claim 4 wherein the comminuted oleaginous seed material has an average particle size of from about 20 microns to about 150 microns.

6. A process according to claim 1 wherein said polyol is selected from the group consisting of 1,2-propylene glycol, 1,3-propylene glycol, glycerine, or mixtures thereof.

7. A process according to claim 1 wherein said carbohydrate is a disaccharide or low molecular weight polysaccharide.

8. A process according to claim 7 wherein said carbohydrate is selected from the group consisting of sucrose, raffinose, stachyose, corn syrup solids or low molecular weight dextrans.

9. A process according to claim 1 wherein said vegetable seed material contains from about 5% to about 70% lipid, and comprising the additional step of defatting the isolated vegetable seed protein granules.

10. A process according to claim 9, comprising the additional step of extracting the isolated protein granules with an alcohol/water mixture containing from about 50 parts to about 70 parts of alcohol by weight.

11. A process according to claim 10 wherein said alcohol is ethanol.

12. A process according to claim 1 wherein said vegetable seed material contains from 0% to about 5% lipid, and comprising the additional step of extracting the isolated protein granules with an alcohol/water mixture containing from about 50 parts to about 70 parts of alcohol by weight.

13. A process according to claim 12 wherein said alcohol is ethanol.

* * * * *